Patented Sept. 19, 1950

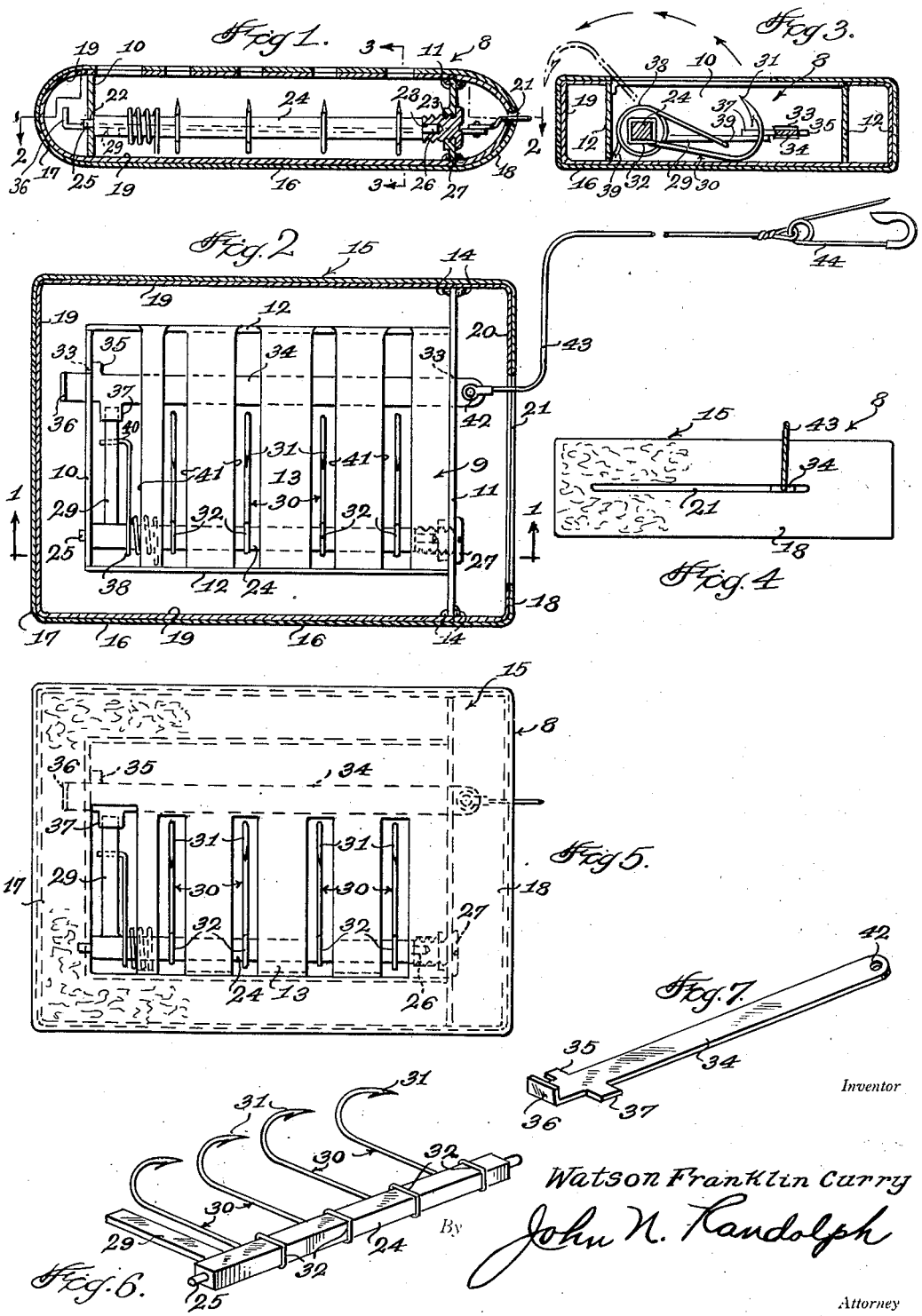

2,522,606

UNITED STATES PATENT OFFICE 2,522,606

PICKPOCKET TRAP

Watson Franklin Curry, St. Louis, Mo.

Application July 22, 1949, Serial No. 106,106

4 Claims. (Cl. 43—59)

This invention relates to a novel trap for use in capturing pickpockets and more particularly to a trap which is constructed to simulate a wallet or pocketbook which is adapted to be carried in a garment pocket tethered to the garment or pocket so that when the trap is grasped and an attempt is made to remove it from the pocket the trap will thereby be sprung from a set position by a pull exerted on its tethering means for trapping the pickpocket.

More particularly, it is an aim of the present invention to provide a trap which is adapted to be normally carried in the pocket in a set position and which is provided with spring projected hooks which are released and spring projected by removal of the trap from the pocket for piercing the hand of a thief holding the wallet trap to thereby prevent the thief from escaping.

Still a further object of the invention is to provide a trap which is constructed to very realistically simulate a wallet and which is covered with leather or similar wallet or pocketbook material so that pickpockets, in grasping the trap, cannot distinguish it from a wallet by the feel thereof and will not thereby be forewarned against attempting to remove the wallet trap.

Still another object of the invention is to provide a trap of extremely simple construction which will function efficiently for its intended purpose and which may be readily reset after use.

Various other objects and advantages of the invention will hereinafter become more fully apparent from the following description of the drawing, illustrating a presently preferred embodiment thereof, and wherein:

Figure 1 is a longitudinal sectional view of the trap taken substantially along a plane as indicated by the line 1—1 of Figure 2;

Figure 2 is a horizontal sectional view, partly in top plan of the trap taken substantially along a plane as indicated by the line 2—2 of Figure 1;

Figure 3 is a cross sectional view of the trap taken substantially along a plane as indicated by the line 3—3 of Figure 1;

Figure 4 is an end elevational view of the invention looking from right to left of Figures 1 and 2;

Figure 5 is a top plan view of the trap; and

Figures 6 and 7 are perspective views of certain of the parts of the trap.

Referring more specifically to the drawing, the pickpocket trap in its entirety and comprising the invention is designated generally 8 and includes a housing, designated generally 9 of sheet metal which is composed of end walls 10 and 11, corresponding side walls 12 which are connected to or formed integral with the end walls 10 and 11 and a top wall 13. As best seen in Figure 2, the end wall 11 extends to beyond the side walls 12 and is secured at its ends by a suitable bonding medium 14 or in any other desired manner to portions of the interior of a casing, designated generally 15 which encloses the trap housing 9.

Said casing 15 is preferably formed of leather or any other material corresponding to a material of which a pocket book or wallet is formed and is of substantially the same shape and size as a wallet and includes an outer envelope-like section 16 having rounded ends 17 and 18, similar in shape to the ends of a wallet and which are spaced outwardly from the end walls 10 and 11 of the housing 9. The trap casing 15 is also provided with an inner section or ply 19 which extends around the end 17 thereof and along the bottom or side which is located remote to the top wall 13 of the housing 9 and along the side edges of the trap and along the top thereof outwardly of the side walls 12. The end 18 of the casing 15 is provided with a separate inner ply 20 the edges of which are bonded, likewise as seen at 14 in Figure 2, to the opposite, outer side of the end wall 11. The rounded end 18 of the trap casing 15 is provided with an elongated slot or opening 21, for a purpose which will hereinafter become apparent.

The end wall 10 is provided with a small opening 22 and the end wall 11 is provided with an enlarged flanged and internally threaded opening 23 which aligns with said opening 22. A rod or shaft 24 which is preferably square in cross section is provided with restricted extensions 25 and 26 which project from the ends thereof and which are of circular cross section. The extension 25 is journaled in the opening 22 and the rod or shaft 24 is of a length so that its extension 26 is then spaced from the flanged opening 23 of the end wall 11. An externally threaded socket member 27 is threaded inwardly into the opening 23 and has an inwardly opening socket 28 to receive and journal the extension 26 so that the shaft or rod 24 is rotatably mounted in the housing 9 by its extensions 25 and 26 which are journaled in the opening 22 and socket 28, respectively.

The shaft 24 is provided with a rigid bar 29 which is fixedly secured thereto and which projects laterally therefrom adjacent the end thereof provided with the extension 25. A plurality of hooks 30, corresponding to fishhooks and having turned back barbed ends 31 are each provided with a substantially straight shank terminating in a square eye or loop 32 which is secured by a tight press fit engagement on the square shaft 24 to prevent the trap hooks 30 from turning relatively to the shaft 24 and so that the shanks of said hooks will be disposed in substantially the same plane as the bar 29. The barbed ends 31 of the hooks extend upwardly from the hook shanks toward the top wall 13 when the trap is in a set position, as illustrated in the drawing.

The end walls 10 and 11 are provided with aligned openings 33 for reciprocally receiving the end portions of a trigger bar 34 which is disposed reciprocally therein for longitudinal sliding movement in the housing 9 and which is disposed beyond the turned back barbed ends 31 of the hooks 30. The openings 33 are sufficiently large so that one end of the trigger bar 34 can be inserted outwardly through the opening 33 of the end wall 11 with the bar 34 flexed slightly and after which the other end may be moved outwardly through the other opening 33 by sliding the bar 34 in the opposite direction or from right to left of Figure 2. Said bar 34 is provided with a lateral projection 35 for engaging the inner side of the end wall 10 to limit the extent that the trigger bar 34 can move outwardly through the opening 33 of end wall 10. After the bar 34 has thus been applied, the end thereof which is disposed outwardly of the end wall 10 is turned upwardly to form a stop 36 for limiting the extent that the bar 34 can be moved from left to right, as seen in Figure 2, so that the reciprocating movement of the trigger bar 34 is limited by the stops 35 and 36 engaging opposite sides of the end wall 10, for a purpose which will hereinafter become apparent. The trigger bar 34 is provided with an integral lateral extension 37 which is disposed inwardly of and adjacent the end wall 10 and which extends toward the rod or shaft 24 to provide a detent which is adapted to be disposed over the free end of the bar 29 when the trap 8 is in a set position and with the stop 25 engaging the inner side of the end wall 10, as illustrated in Figure 2, to thereby prevent the bar 29 and the hooks 30 from swinging upwardly. The rod or shaft 24 is urged to rotate in a direction to cause the hooks 30 to swing upwardly or toward the top wall 13 by a spring 38 which is wound on the shaft 24 between the bar 29 and the adjacent hook 30 and one end of which spring, designated 39, extends downwardly and bears against the inner side of the adjacent wall 12, as seen in Figure 3, and the other end thereof extends in the opposite direction and has a lateral terminal 40 which engages under the bar 29 for urging said bar to swing upwardly or toward the top wall 13 for urging the hooks 30 to swing in the same direction. However, it will be seen that when the trap 8 is set, as illustrated in Figure 2, the parts are held against swinging movement by the trigger detent 37 engaging over the free end of the bar 29.

The top wall 13 and the casing ply 16 which overlies said top wall 13 are provided with transversely extending slots or openings 41 located above each of the hooks 30 and the bar 29 and spring end 40 so that when said bar 29 is released by the trigger detent 37 the spring 38 can turn the shaft 24 in a counterclockwise direction as seen in Figure 3, to swing the bar 29 and the hooks 30 in a counterclockwise direction upwardly and through the slots or openings 41 so that said hooks will move from their full line to their dotted line position under the biasing action of the spring 38.

The opposite end of the trigger bar 34 which is disposed between the end wall 11 and the slot 21 is provided with an eye 42 to which one end of a flexible tethering member 43 is secured and which extends outwardly through the slot 21 and is provided with a safety pin 44 at its opposite end which is adapted to be secured in a garment pocket in which the trap 8 is disposed in a set position.

Accordingly, it will be readily apparent that when a thief or pickpocket reaches into the pocket containing the trap 8 and grasps and removes the trap from the pocket, when the trap 8 is moved to the extent permitted by the tether 43, which may be of any desired length, a pull will then be exerted on the trigger bar 34 to displace it toward the trap end 18 thereby moving the trigger detent 37 out of engagement with the bar 29 so that the spring 38 can project the hooks 30 toward their dotted line positions of Figure 3. The strength of the spring 38 will thus cause the hooks to be embedded in the hand of the pickpocket who is grasping the trap to thereby ensnare the pickpocket so that he cannot escape. The leather enclosure or casing 15 of the trap 8 will so nearly resemble a conventional pocketbook that a thief in grasping the pocketbook will not be forewarned, as previously stated, and the slots or openings 41 are made sufficiently narrow so that they will likewise not disclose the character of the trap 8.

Obviously, the trap 8 is intended to be used by law enforcement officers particularly detailed to places frequented by pickpockets and thieves.

Various modifications and changes are contemplated and may obviously be resorted to, without departing from the spirit or scope of the invention as hereinafter defined by the appended claims.

I claim as my invention:

1. A pickpocket trap comprising a casing formed of leather or the like of a size and shape to simulate a wallet, a substantially rigid housing secured within said casing, a shaft journaled in said housing, a plurality of piercing hooks fixedly mounted on said shaft for rotation therewith, spring means for revolving said shaft in one direction for swinging the hooks toward a projected position outwardly of the trap housing and casing, a trigger member reciprocally mounted in said housing, a bar fixed to said shaft and normally engaging under a portion of said trigger member when the trap is in a set position for holding said spring under tension and for retaining the shaft in a position with the hooks disposed within the housing, a wall of said housing and the casing portion covering said wall being provided with slots through which the hooks are swingable outwardly of the trap when the spring is released by movement of said trigger, and a flexible tether connected to one end of said trigger and adapted to be detachably secured in a garment pocket containing the trap for releasing the trigger when a pull is exerted on the trap.

2. A pickpocket trap as in claim 1, said shaft having a portion of non-circular cross section, and said hooks having eyes at their shank ends shaped to tightly engage said shaft for non-rotatably mounting the hooks on the shaft.

3. A pickpocket trap comprising a casing formed of leather of a shape and size to simulate a wallet, a substantially rigid housing secured in said casing, a shaft journaled in said housing, a plurality of trap hooks fixed to said shaft for rotation therewith, said housing and casing having slots through which said hooks are swingable from positions within the housing to projected positions outwardly of the trap, spring means for urging said shaft to turn in a direction for moving the hooks to projected positions, a trigger for normally holding said shaft against the action of said spring means in a set position and with said hooks disposed in the housing, and a tethering member fastened at one end thereof to said trigger and having a garment engaging clasp at its opposite end for moving the trigger to a released position when a pull is exerted thereon.

4. A trap as in claim 3, said hooks having turned back barbed free ends adapted to pierce a hand grasping the trap when the hooks are spring urged to projected position.

WATSON FRANKLIN CURRY.

No references cited.